United States Patent [19]

Allred et al.

[11] Patent Number: 4,702,955
[45] Date of Patent: Oct. 27, 1987

[54] MULTILAYER DECORATIVE COATING

[75] Inventors: David Allred; Alan Kadin, both of Troy; Purnachandra Pai, Birmingham, all of Mich.

[73] Assignee: Ovonic Synthetic Materials Company, Inc., Troy, Mich.

[21] Appl. No.: 822,447

[22] Filed: Jan. 27, 1986

Related U.S. Application Data

[63] Continuation-in-part of Ser. No. 758,260, Jul. 24, 1985, abandoned.

[51] Int. Cl.⁴ .......................... B32B 7/02; B32B 17/06
[52] U.S. Cl. ........................................ 428/213; 350/1.7; 427/10; 427/165; 428/216; 428/336; 428/433; 428/472; 428/701
[58] Field of Search ............... 428/333, 336, 623, 627, 428/630, 213, 216, 472, 433, 701; 427/229, 10, 165, 162; 350/1.7; 136/258

[56] References Cited

U.S. PATENT DOCUMENTS

| | | | |
|---|---|---|---|
| 3,176,575 | 4/1965 | Socha | 428/333 X |
| 3,411,934 | 11/1968 | Englehart et al. | 427/165 X |
| 3,781,089 | 12/1973 | Fay et al. | 427/10 X |
| 3,958,042 | 5/1976 | Katsube et al. | 427/162 |
| 4,170,460 | 10/1979 | Donley | 427/229 X |
| 4,188,452 | 2/1980 | Groth | 428/336 |
| 4,582,764 | 4/1986 | Allerd et al. | 428/627 X |

OTHER PUBLICATIONS

F. A. Cotton et al., Basic Inorganic Chemistry, Publ. John Wiley & Sons, N.Y., 1976, pp. 203–205.

*Primary Examiner*—Thomas J. Herbert
*Attorney, Agent, or Firm*—Marvin S. Siskind; Richard M. Goldman

[57] ABSTRACT

A coated article, for example an architectural transparency, including a vehicular transparency, or a reflecting article, as a decorative article. The article has a substrate, e.g., a substantially transparent or substantially opaque substrate. The substrate has an optical coating on it, that is a coating having a thin film of an oxide of a transition metal, the thin film having a thickness corresponding to a constructively interfering function of a wavelength of interest. The optical coating, having a thin film of a transition metal, enhances the reflectivity of some wavelengths of the visible portion of the electromagnetic spectrum and the reflectivity of other wavelengths of the visible portion of the electromagnetic spectrum.

47 Claims, 4 Drawing Figures

MULTILAYER DECORATIVE COATING

CROSS REFERENCE TO RELATED APPLICATION

This is a continuation-in-part of our commonly assigned, copending U.S. application Ser. No. 758,260 filed July 24, 1985 for *Multilayered Decorative Coating*.

FIELD OF THE INVENTION

The invention disclosed herein relates to decorative coatings that utilize optical interference phenomena for their color and decorative effect.

BACKGROUND OF THE INVENTION

Flat glass is utilized as windows for vehicles and buildings. The glasses so utilized have a relatively flat transmission curve across the near infra-red, visible, and ultra-violet portions of the electro-magnetic spectrum. For many applications, it would be desirable to reflect some portions of the spectrum, and transmit other portions, either with or without attenuation. Various pigments, dyes, and anti-reflection coatings have been used to these ends. For example, high and low refractive index coatings have been used as anti-reflection coatings, i.e., to increase transmission, while multi-layer coatings, dyes, and chemical modification of the subjacent glass have been used to impart color.

High and low refractive index materials have heretofore been used as neutral color anti-reflective coatings on transparent substrates. Multi-layer anti-reflective coatings are described, for example, in U.S. Pat. Nos. 3,410,625 to Edwards, 3,781,089 to Cicotta, 3,958,042 to Katsube and 3,176,575 to Socha. Edwards describes a repeating structure of dielectric layer pairs, one member of the layer pair being a high refractive index material, and the other member of the layer pair being a low refractive index material. The layer thickness is L/4n where L is the wavelength sought to be reflected, and n is the refractive index of the light of wavelength L in the medium.

Cricotta, et al describe an anti-reflecting neutral density filter made up of a repeating structure of layer pairs. One member of the layer pair is a high refractive index metal, and the other member is a low refractive index dielectric. The alternating layer pair structure provides a non-colored, neutral density filter of desired optical density and reflectivity.

Katsube, et al describe an anti-reflecting coating of alternating high and low refractive index layers. Each layer has a thickness on the order of 0.0125 to 0.050 wavelengths. The anti-reflective coating is color free.

Socha describes a low reflectance multilayer for glass. The multilayer includes a $SiO_2$ layer approximately 1/32 to 1/16 wavelength thick on the glass, and high refractive index layer approximately ½ wavelength thick on the $SiO_2$, and an intermediate refractive index coating approximately ½ wavelength thick atop the high refractive index layer. The resulting colorless coating is an anti-reflective coating.

U.S. Pat. No. 4,188,452 to Groth and 3,411,934 to Englehart utilize multiple oxide coatings for architectural effect. Groth uses layers of $SiO_2$ and $TiO_2$ to reflect ultraviolet light. Englehart uses multiple layers of cobalt oxide and tin oxide to provide a color reflecting coating.

U.S. Pat. No. 4,170,460 to Donley describes a method of making colored glass articles by the migration of optically active metal ions into a chemically tempered glass substrate, thereby forming a colored, high refractive index zone within the glass. This metallized zone has a higher refractive index then the subjacent glass. A metal layer is then deposited above the treated glass and completely oxidized to form a coating of higher refractive index. The resulting oxide coating interacts with the chemically tempered, metal-ion containing glass to form an interference film.

The use of reflective coatings of high refractive index oxides is disclosed in published British patent application No. 2,063,920 of J. P. Coad, et al. Coad, et al describes production of reflective surfaces by ion beam sputtering of enumerated transition metals onto a substrate and subsequent anodizing of the sputtered metal to form a high refractive index oxide thin film, capable of interference. However, Coad, et al do not disclose partially transparent coatings. Their coatings are opaque. Nor does the Coad patent disclose thermal oxidation or plasma oxidation of the sputtered metal film.

SUMMARY OF THE INVENTION

The present invention provides semi-transparent or opaque thin film, dielectric coatings of brilliant, saturated colors. This is done by balancing the reflections from top and bottom interfaces of the semitransparent dielectric thin film. That is, this is done by balancing the reflectances at (1) the dielectric air interface, $r_1$, and (2) the dielectric-subjacent material interface, $r_2$. When these reflectances are imbalanced the colors are dull and washed out. However, when these two reflectances are substantially equal and large, the reflected colors are brilliant saturated colors, of high finesse. When the reflectances $r_1$ and $r_2$ are substantially equal, the reflectivities as a function of wavelength are given by:

$$R_{max} \text{ (wavelength)} = [(r_1 + r_2)/(1 + r_1 r_2)]^2, \text{ and} \quad (1)$$

$$R_{min} \text{ (wavelength)} = [(r_1 - r_2)/(1 - r_1 r_2)]^2. \quad (2)$$

The purity of color is given by $$(R_{max} - R_{min})/R_{min}, \quad (3)$$

where $R_{max}$ is given by equation (1), and $R_{min}$ is given by equation (2).

When $r_2$ is not equal to $r_1$, the reflectances are imbalanced, and the resulting colors washed out. According to the invention herein contemplated a semitransparent coating is provided having relatively balanced reflectances.

According to the invention contemplated herein, there is provided a semi-transparent or opaque reflecting article. The article, for example, an architectural transparency, a glass substrate vehicle window, a polymeric substrate vehicle window, a plumbing fixture or a piece of automotive trim, has a substantially transparent or substantially opaque substrate with a partially reflective, partially light transmitting thin film surface deposited thereon. The partially reflecting, partially transmitting thin film has a transparent oxide of a transition metal extending inward from a free surface thereof to a depth that is sufficient to provide substantially destructive interference of a desired band of optical wavelengths. The oxide is generally from about 420 angstroms to about 2200 angstroms thick, but it may be as high as 10 wavelengths thick.

The unoxidized remainder of the thin film, that is, the metallic portions, has a thickness selected to provide, in conjunction with the dielectric or oxide portion, a desired transmission. The total thickness of the coating is a periodic function of the wavelengths to be transmitted, the wavelengths to be reflected, and the refractive indices of the oxide and metallic portions of the film.

According to the further exemplification of the invention, a thin film of high reflectivity metal, i.e., a coinage metal of Group IB of the Periodic Chart, such as copper, silver, or gold, and preferably silver, is interposed between the oxidized or partially oxidized transition metal thin film and the substrate. In this way, a first interface or surface is provided at the free surface of the oxide i.e., the surface of the oxide remote from the group IB metal, and a second reflective interface is provided between the oxidized transition metal thin film and the combination of (i) an unoxidized transition metal and (ii) the thin film of highly reflective IB metal. By proper control of the thicknesses of the unoxidized and oxidized portions of the deposited transition metal film, and the thickness of the Group IB metal, it is possible to obtain colors of very high finesse for a wide range of transmissivities.

High finesse has heretofore been difficult to obtain in combination with high transmissivity. The thin film of the Group IB metal makes it possible to obtain high finesse over a wide range of transmissivities.

Finesse is a measure of the purity of the color of the reflected light, that is the maximum and minimum reflectivities as a function of wavelength. High finesse is associated with a large difference between reflectivities as a function of wavelength, while low finesse is associated with smaller differences between reflectivities as a function of wavelength. Finesse is a function of optical interactions, e.g., reflections, at boundaries and interfaces. Finesse is relatively high when the boundaries of the layer or layers providing interference have relatively equal reflectivities of high amplitude.

According to a still further exemplification of the invention, there is provided a reflective article having an opalescent multilayer coating. The multilayer coating comprises a plurality of layered pairs. Each layered pair contains a layer of a relatively high refractive index material and a layer of relatively low refractive index and/or relatively high reflectivity and/or relatively high transmissivity. A plurality of these layers are deposited whereby to provide an opalescent material, that is, a material coating having an apparent depth effect. In one exemplification, a single high reflectivity layer is provided between a pair of high refractive index layers.

The high reflectivity layer, which may also act as a stop layer for anodization or chemical oxidation, may be a coinage metal, as copper, silver, or gold as described above, and preferably is silver.

According to the invention herein contemplated, the thin film layers may be deposited by sputtering, chemical vapor deposition, spray pyrolysis plasma assisted chemical vapor deposition including glow discharge, and plasma assisted chemical vapor deposition including a microwave excited, plasma assisted chemical vapor deposition.

The coinage metal film may be deposited, e.g., by evaporation, or by sputtering, by spraying, or by other methods well known in the art.

Oxidation may be carried out by depositing the thin film directly as an oxide, for example by chemical vapor deposition, reactive sputtering or by glow discharge with a suitable oxidizing gas. Preferably, to attain uniformity of thickness of the oxide, the oxide may be formed by controlled anodization, for example, controlling to a color, controlling to a transmission coefficient, or controlling to a voltage.

Alternatively, oxidation may be carried out by thermal oxidation of the as deposited unoxidized film in contact with air or with any other appropriate reagent. The color displayed by the oxidized film depends on both the temperature at which the film is oxidized and the duration of the oxidation process. By proper control of these variables, a uniform color of the desired hue may be obtained in the coating.

Alternatively, oxidation may also be carried out by plasma oxidation of the as deposited unoxidized film. The plasma oxidation may be carried out in an atmosphere of, for example, substantially pure $O_2$, $He/NO_2$, up to 50% $O_2$ in He, and up to 50% $O_2$ in Ar.

A BRIEF DESCRIPTION OF THE DRAWINGS

The invention may be understood by reference to the Figures appended hereto.

DETAILED DESCRIPTION OF THE INVENTION

Figure 1:
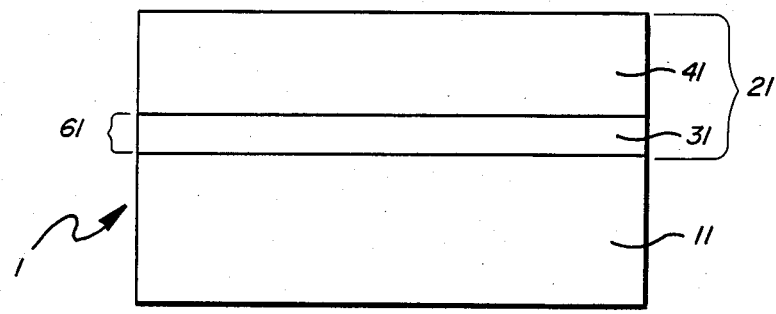
FIG. 1 shows one embodiment of an oxidized transition metal thin film deposited on a suitable substrate.

According to one embodiment of the invention herein contemplated and illustrated in FIG. 1, there is provided a semi-transparent reflective article 1 comprising a substantially transparent substrate 11 and a partially or totally oxidized thin film 21, e.g., of a transition metal deposited thereon. The transition metal thin film 21 is oxidized to a depth sufficient to provide substantially destructive interference of a desired band of optical wavelengths. The total thickness of the thin film 21 including the oxidized portion 41 and the non-oxidized portion 31, when present, is from about 700 angstroms to about 2600 angstroms.

Generally, the thickness of the oxidized portion 41 of the transition metal thin film 21 is from about 420 angstroms to about 2200 angstroms. The lower limit is for first fringe. The upper limit is dictated by the loss of esthetically pleasing colors. For second and higher fringes, the thickness is greater.

For partially transparent coatings the fringe may be any harmonic that does not result in a film so thick as to degrade the intended optical function. Generally the fringe order number is less than 10. Most commonly the harmonic is 1,2, or 3, depending upon the desired pitch, hue, and saturation. For example, for the first purple fringe gives a royal purple, while the second purple fringe gives a plum-lilac color. For green, the first fringe gives a yellow-green, while the second fringe gives a bright lime green.

The thickness of the non-oxidized portion 31 of the transition metal 21 is sufficient to provide an optical transmission coefficient, from a weighted integration over the desired portion of the visible portion of the electromagnetic spectrum of at least about 0.001. This provides some degree of optical transmissivity. The non-oxidized portion 31 of the film is generally from about 100 angstroms thick to about 500 angstroms thick. Thicknesses of greater than about 500 angstroms result in a substantial blockage of light.

Figure 2:
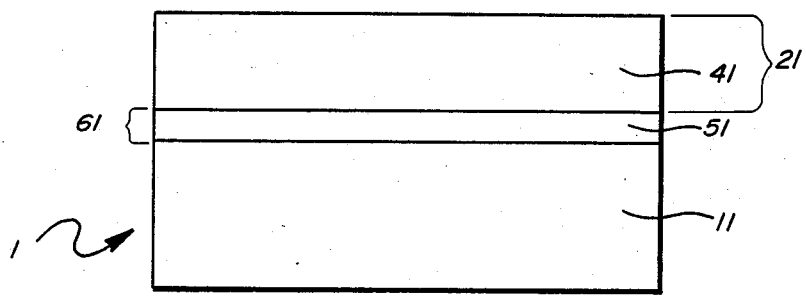
FIG. 2 shows an alternative embodiment of the invention where a Group IB metal is interposed between the transition metal and the substrate. The transition metal is substantially fully anodized or oxidized.
Figure 3:
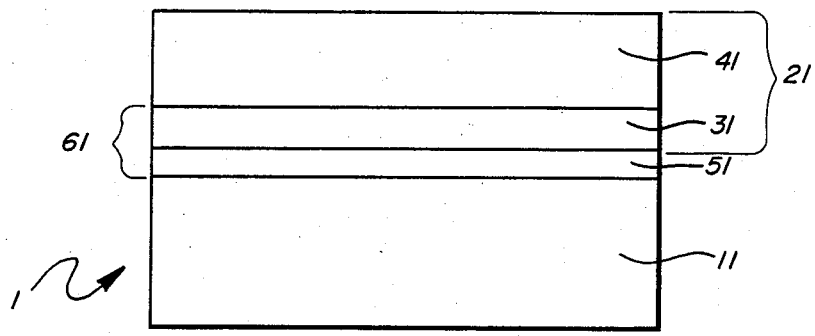
FIG. 3 shows a further alternative embodiment of the invention where the Group IB metal is interposed between the substrate and the transition metal film. The transition metal film is only partially oxidized, i.e., anodized thermally oxidized, or plasma oxidized.

According to a further embodiment of the invention shown in FIGS. 2, and 3, there is provided a coated article 1 comprising a substrate 11 having a coating thereon. The coating includes a thin film comprising predominantly a Group IB metal 51 and a thin film of oxidized or partially oxidized transition metal 21. The oxidized or partially oxidized thin film transition metal is separated from the substrate by the thin film of Group IB metal. This results in the formation of a second interface, between the oxide 41 and either the subjacent metals 61, as the Group IB metal thin film 51, or the combination of the transition metal thin film 31 and the Group IB metal thin film 51.

In FIG. 2, the transition metal thin film 21 is substantially completely oxidized having only the oxidized transition metal portion 41. In the embodiment shown in FIG. 2, the interface is between the fully oxidized thin film 41 and the thin film of Group IB metal 51.

In the embodiment shown in FIG. 3, the deposited transition metal thin film 21 is partially oxidized with an oxide layer 41 and a metallic layer 31. The contemplated layer for high reflectivity is the layer 61, comprising the layer 31 of unoxidized transition metal and the thin film 51 of the Group IB metal.

A free surface is the opposite surface of the oxidized portion 41 of the deposited film of transition metal 21. The reflectivities of (1) the free surface of the film 41, and (2) the interface of the oxidized portion 41 with 61, the combination of (a) the Group IB metal layer 51 and (b) the unoxidized deposited transition metal thin film 31, are such that the reflectivities are large and approach each other in numerical value, thereby resulting in a high finesse coating.

Finesse is a measure of the purity of the color of the reflected light, i.e., the maximum and minimum reflectivities as a function of wavelength. High finesse is a high ratio of maximum reflectivity to minimum reflectivity, while low finesse is a low ratio of maximum reflectivity to minimum reflectivity. Finesse is a function of interactions at boundaries and/or interfaces. It is relatively high when both boundaries of the oxide film 41, i.e., the free surface, and the interface with the metallic portion 61, i.e. the combination of the non-oxidized metal 31 and the Group IB metal 51, have the same high reflectivity. Coatings capable of high finesse are shown in FIGS. 2 and 3.

In the embodiment shown in FIG. 2, the reflectivity of the interface between the oxide film 41 and the Group IB metal film 51 is a high reflectivity interface, i.e., higher than the reflectivity of the interface between the transition metal portion 31 of the thin film 21 and the oxide portion 41 of the thin film 21, such as shown in FIG. 1, thereby resulting in a higher finesse coating. Similarly, in FIG. 3, the interface between the oxidized portion 41 and the combination of (i) the metallic portion 31 of the transition metal thin film 21, and (ii) the Group IB metal thin film 51 is the highly reflecting interface, imparting high finesse to the coating. The Group IB metal thin film 51 makes possible a highly transparent and high finesse coating. The presence of the Group IB metal thin film 51 with the transsition metal 31 in the metallic region 61 allows control of transmissivity while maintaining high finesse.

The upper surface of the transition metal thin film may be a free surface with the environment or may have a further protective film thereon.

The herein contemplated film 51 of Group IB metal and the oxidized or partially oxidized transition metal film 21 may be a color coating having a high finesse. The substrate 1 may be substantially transparent whereby to provide a substantially transparent article. Alternatively, the substrate may be opaque.

The film 51 of the Group IB metal may be a substantially transparent film having a thickness of about 30 to about 200 angstroms. The Group IB metal is chosen from the group consisting of copper, silver, and gold. The Group IB metal is preferably one having an optical absorption edge beyond the visible portion of the electromagnetic spectrum, i.e., silver. The group IB metal may further act as a stop point or end point for the anodization, thermal oxidation, or plasma oxidation of the transition metal film.

By the term "thermal oxidation" is meant contacting the article with an appropriate oxidizing reagent at an elevated temperature. The reagent may be any suitable oxidizing reagent such as, by way of example, air, oxygen, hydrogen peroxide, permangenate, dichromate, ozone, acids, perchlorates and the like.

By the term "plasma oxidation" is meant contacting the article with energized ions of an appropriate gas, typically, substantially pure $O_2$, $He/NO_2$, up to 50% $O_2$ in He, and up to 50% $O_2$ in Ar. The gas is at a very low pressure, e.g., 1 ml, and may be plasmized by any means known in the art, such as microwave energy.

The oxidized portion 41 of transition metal thin film is from about 420 to about 2200 angstroms thick. The total thickness of the transition metal thin film 21 is such as to provide constructive interference in the desired wavelength band.

Figure 4:
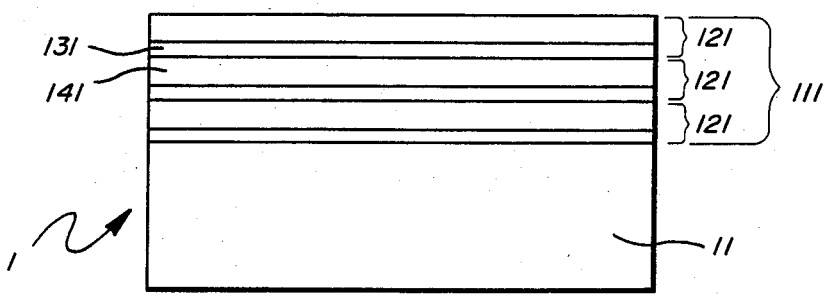
FIG. 4 shows a still further exemplification of a multilayer article having a plurality of layered pairs of high refractive index and low refractive index.
Figure 5:
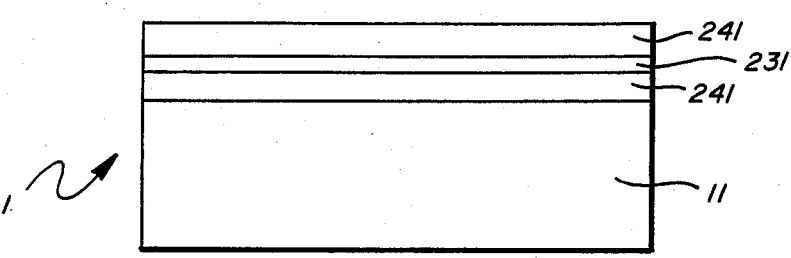
FIG. 5 shows a multilayer article having one film of a high refractive index material, an intermediate film of a low refractive index and/or high reflectivity material and a further film of a high refractive index material.

According to a still further exemplification of the invention, shown in FIG. 4 there is provided a reflecting article comprising a substrate 11 and a multilayer thin film coating 111 deposited on the substrate. The multilayer thin film coating 111 has a plurality of layer pairs 121, each layered pair has a substantially light transmissive thin film layer 131, e.g., of a transition metal or a Group IB metal, and a substantially high refractive index thin film layer 141 comprising e.g., an oxide of transition metal. The high refractive index layers 141, have a thickness to provide constructive interference of a harmonic of a desired band of light. The total thickness of the layer is such so as to provide optical transmissivity to the next subjacent layer pair in the multilayer coating. Generally, the thickness of the high refractive index portion 141 of the thin metal film 121 is such as to provide the refraction, with the more transmissive or less refractive portion 131 being just thick enough to provide a phase boundary. This is a thickness of from about 420 to about 2200 angstroms for the anodized or thermally or plasma oxidized portion and from about 150 to about 500 angstroms for the unanodized or unoxidized portion.

While the embodiment shown in FIG. 4 is illustrated with respect to oxidized 41 and metallic 31 portions of transition metal deposits 21, other materials may be utilized. In order to obtain the results contemplated, it is necessary that the members of the layer pair differ from one another in refractive index, with the layer 131 acting as a boundary, e.g., a reflecting boundary between layers 41 of high refractive index materials. The high refractive index material may be a dielectric, e.g. $Nb_2O_5$, $SiO_2$, $Si_3N_4$, and the like.

According to a still further exemplification of the invention, there is provided a high reflectivity article having a substrate 11 with two films of oxidized transition metal 241 and 241' where a film 241' is deposited on the substrate and a thin film of the Group IB metal 231 is deposited between the first film 241' and the second film 241 of transition metal. This provides a high finesse and transparency.

The transition metal may be an transition metal that readily forms an oxide when rendered anodic in suitable electrolytic media, for example, titanium, zirconium, hafnium, vanadium, niobium, tantalum, chromium, molybdenum, and tungsten. These metals are referred to as the "valve" metals and "film forming metals". Especially preferred because of its brilliant colors and ease of oxidation control is niobium. Other preferred metals or tantalum and molybdenum.

According to a particularly preferred exemplification of forming the article herein contemplated, the thin films are deposited by vacuum techniques, for example, evaporation or sputtering in the case of silver, and sputtering, reactive sputtering, plasma assisted chemical deposition including radio frequency plasma assisted chemical vapor deposition in the case of the transition metals.

According to a particularly preferred exemplification, the Group IB metal thin film, when present, is deposited by sputtering, and the transition metal is deposited by sputtering and thereafter electrochemically oxidized. Electrochemical oxidation may be carried out by anodization, for example, the use of an alkaline or acidic, and preferably an acidic medium where the thin film is rendered anodic whereby to form an oxide layer.

Oxidation is carried out to form a film of a desired thickness. Oxidation may be controlled by controlling the voltage at constant current, by controlling the current at constant voltage, by controlling the light transimissivity, or by controlling the refractive index or the reflected color.

According to another particularly preferred exemplification, the transition metal is deposited by sputtering and thereafter thermally oxidized in air. Oxidation may be controlled by controlling the temperature at which the process is carried out, by controlling the duration of the process, or by controlling both. Proper contral of those parameters will result in a coating of uniform color of any desired hue.

According to another particularly preferred exemplification, the transition metal is deposited by sputtering and thereafter plasma oxidized in substantially pure $O_2$, in $He/NO_2$, in up to 50% $O_2$ in Ar, or in up to 50% $O_2$ in He. Oxidation may be controlled by controlling the duration of the process, by controlling substrate temperature or by contral of the gas mix to obtain the desired color.

The following examples are illustrative of the method of the invention.

EXAMPLE 1

A series of tests were carried out to prepare high reflectivity, transmissive articles. The articles were prepared by sputtering niobium onto a glass substrate, and thereafter anodizing the resulting deposit.

For each sample, sputtering was carried out at a pressure 4 to 10 microns of argon with niobium targets. A d.c. bias was applied to the substrate to cause sputtering. Sputtering was carried out to provide deposits 800 to 2000 angstroms thick. The resulting deposits were substantially non-reflective and substantially nontransmissive.

Anodization was carried out in an aqueous ammonium pentaborate-ethylene glycol solution. The solution was prepared by adding 156 grams of ammonium pentaborate to 1120 milliliter of ethylene glycol and 760 milliliters of distilled water. Each sample was inserted in the solution, spaced 0.5 mil (12 mm) from a copper plate, and rendered anodic. A Hewlett-Packard 6218A power supply and Hewlett-Packard 6177C DC power source were used, with power controlled at 1 milliamp per square centimeter.

| Example | Voltage at End of Anodization | Color at End of Anodization |
|---|---|---|
| I | 5 | Brown-grey |
| II | 15 | Brown |
| III | 20 | Blue-Violet |
| IV | 25 | Blue |
| V | 40 | Blue |
| VI | 45 | Yellow-Green |
| VII | 55 | Yellow |
| VIII | 60 | Bronze |
| IX | 65 | Pink |
| X | 70 | Purple |
| XI | 80 | Blue |
| XII | 85 | Blue-Green |
| XIII | 90 | Green |
| XIV | 105 | Yellow-Green |
| XV | 115 | Yellow |

The coated glass of Example XIII was deposited as an 1100 angstrom thick film of niobium. Anodization was carried out at a constant current of 1 milliamp per square centimeter until the voltage was 90 volts. This voltage was attained in 5 minutes and 50 seconds. The resulting film had high finesse in the green portion of the spectrum, was 2530 angstroms thick, had a transmissivity of 6 to 10 percent, and transmitted pink to purple light.

The coated glass of Example X was deposited as a 1000 angstrom thick film of niobium. Anodization was carried out at a constant current of 1 milliamp per square centimeter until the voltage was 70 volts. This voltage was attained in 4 minutes and 45 seconds. The resulting film had high finesse in the purple portion of the spectrum, was 2220 angstroms thick, had a transmissivity of 8 to 11 percent, and transmitted green light.

EXAMPLE 2

Samples were also prepared by the thermal oxidation technique. The samples were prepared by sputtering niobium or aluminum onto a glass substrate, and thereafter thermally oxidizing the resulting deposit. Sputtering was performed as described in Example 1.

Thermal oxidation was carried out in 50% He/50% Ar atmosphere at a pressure of 100 millitor and a temperature of 350° C. Samples allowed to oxidize for 20 minutes displayed a purple color. When allowed to proceed for 30 minutes, the technique produced samples with a gold color.

While the invention has been described with respect to certain preferred exemplifications and embodiments, it is not intended to be limited thereby, but solely by the claims appended hereto.

What we claim is:

1. A reflecting article comprising a substrate having a coating thereon said coating comprising:
   a partially oxidized transition metal thin film deposited, on the substrate said transition metal chosen from the group consisting of Group IVB, VB and VIB of the periodic table, the partially oxidized transition metal thin film being oxidized to a thickness to provide substantially constructive interference of a desired band of optical wavelengths, the oxide and metallic portions of the deposited thin film having indices of refraction to provide balanced reflectances at the thin film-air interface and at the transition metal-oxide interface, and the total thickness of the thin film being such to provide an integrated optical transmission coefficient.

2. The reflecting article of claim 1 wherein the depth of the oxidized portion of the transition metal thin film is from about 420 angstroms to about 2200 angstroms, and wherein the thickness of the unoxidized portion of the partially oxidized, transition metal thin film is less than about 500 angstroms whereby to provide an optical transmission integrated over the visible portion of the electromagnetic spectrum, of at least about 0.001.

3. The reflecting article of claim 1 wherein the substrate is an organic polymeric material.

4. The reflecting article of claim 1 wherein the substrate is a metallic substrate.

5. The reflecting article of claim 1 wherein the transition metal is thermally oxidizable.

6. The reflecting article of claim 1 wherein the substrate is a substantially transparent substrate.

7. The reflecting article of claim 6 wherein the reflecting article is a semitransparent reflecting article.

8. The reflecting article of claim 1 wherein the substrate is a ceramic substate.

9. The reflecting article of claim 8 wherein the substrate is a substantially transparent glass.

10. The reflecting article of claim 1 wherein the transistion metal is electrochemically oxidizable.

11. The reflecting article of claim 10 wherein the transition metal is plasma oxidizable.

12. The reflecting article of claim 1 wherein the transition metal is chosen from the group consisting of titanium, zirconium, hafnium, vanadium, niobium, tantalum, chromium, molybdenum, tungsten, and combinations thereof.

13. The reflecting article of claim 12 wherein the transition metal is niobium.

14. The coated article of claim 12 wherein the first interface is with a substantially transparent layer.

15. The coated article of claim 14 wherein the first interface is at a free surface of the oxidized transition metal thin film.

16. The coated article of claim 15 wherein the coating is substantially transparent.

17. A coated article having a substrate and a coating thereon comprising:
   a. a thin film comprising predominantly a Group IB metal;
   b. a thin film of substantially oxidized transition metal, wherein said transition metal is chosen from the group consisting of Groups IVB, VB and VIB of the Periodic Table; and
   c. said oxidized transition metal thin film being separated from the substrate by the Group IB metal thin film, whereby the oxidized transition metal thin film forms;
      i. a first interface on the external surface thereof; and
      ii. a second interface with the combination of (1) the Group IB metal thin film, and (2) any unoxidized portion of the transition metal on the opposite surface thereof from the first interface
   the reflectivity of the second interface approaching the reflectivity of the oxidized transition metal thin film Group IB metal thin film second interface.

18. The coated article of claim 17 wherein the substrate is substantially transparent.

19. The coated article of claim 17 wherein the article is substantially transparent.

20. The coated article of claim 17 wherein the oxidized transition metal thin film is from about 420 to about 2200 angstroms thick.

21. The coated article of claim 17 wherein the transition metal is electrochemically oxidizable.

22. The coated article of claim 17 wherein the transition metal is a thermally oxidizable.

23. The coated article of claim 17 wherein the transition metal is deposited by reactive sputtering.

24. The coated article of claim 17 wherein the transition metal is plasma oxidizable.

25. The coated article of claim 17 wherein the transition metal is niobium.

26. The coated article of claim 17 wherein the oxidized transition metal thin film is completely oxidized.

27. The coated article of claim 17 wherein the oxidized transition metal thin film is partially oxidized, whereby to have an oxidized portion remote from the thin film of the Group IB metal thin film, and a metallic portion in contact with the Group IB metal thin film.

28. The coated article of claim 17 wherein the coating is a colored coating.

29. The coated article of claim 28 wherein the colored coating has a high finesse.

30. The coated article of claim 17 wherein the thin film of the Group IB metal is a substantially transparent film.

31. The coated article of claim 30 wherein the thin film of the Group IB metal is from about 30 to about 200 angstroms thick.

32. The coated article of claim 17 wherein the Group IB metal is chosen from the group consisting of Cu, Ag, and Au.

33. The coated article of claim 32 wherein the Group IB metal is Ag.

34. The coated article of claim 32 wherein the Group IB metal has an optical absorption edge beyond the visible portion of the electromagentic spectrum.

35. An architecturally transparent article adapted for use as a window capable of transmitting portions of the visible spectrum and reflecting portions of the visible spectrum, comprising:
   a. a transparent glass or polymeric substrate; and b. a deposited partially oxidized transition metal thin film deposited thereon, wherein the transition metal film is chosen from the group consisting of Groups IVB, VB and VIB of the Periodic Table, the partially oxidized transition metal thin film being oxidized to a depth to provide substantially constructive interference of the first harmonics of a desired band of optical wavelengths, and destructive interference of other bands of optical wavelengths, the total thickness of the thin film being such to produce an integrated optical transmission coefficient and, the oxide and metallic portions of the deposited thin film having indices of refraction to provide balanced reflectances at the thin film-air interface and at the oxide-metal interface.

36. The architecturally transparent article of claim 35 wherein the depth of the oxidized portion of the transition metal thin film is from about 420 Angstroms to about 2200 Angstroms, and wherein the thickness of the metallic portion of the partially oxidized, transition metal thin film is less than about 500 Angstroms whereby to provide an optical transmission integrated over the visible portion of the electromagnetic spectrum, of at least about 0.001.

37. The architecturally transparent article of claim 35 wherein the transition metal is electrochemically oxidizable.

38. The architecturally transparent article of claim 35 wherein the transition metal is chemically oxidizable.

39. The architecturally transparent article of claim 35 wherein the transition metal is plasma oxidizable.

40. The architecturally transparent article of claim 35 wherein the transition metal is niobium.

41. The architecturally transparent article of claim 35 further comprising a thin film of a Group IB metal on the transparent substrate below the partially oxidized transition metal thin film.

42. The architecturally transparent article of claim 41 wherein the Group IB wherein the Group IB metal is Ag.

43. The architecturally transparent article of claim 41 wherein the thin film of Group IB metal is from 80 to 200 Angstroms thick.

44. A reflecting article comprising:
a. a substrate; and
b. a multilayered coating deposited on said substrate, the multilayered coating comprising a plurality of layer pairs, a layer pair comprising:
  i. a substantially light transmissive thin film layer comprising a metal chosen from the group consisting of transition metals and Group IB metals; and
  ii. a substantially reflective thin film layer comprising an oxide of a transition metal, wherein said transition metal is chosen from the group consisting of Groups IVB, VB and VIB of the Periodic Table, said oxide layer having a thickness to provide constructive interference of the first harmonic of a desired band of optical wavelengths, and destructive interference of other wavelength bands, and the total thickness of the layer pair beign such as to provide optical transmissivity to a next subjacent layer pair in the multilayer coating.

45. The reflecting article of claim 44 wherein the transition metal is niobium.

46. The reflecting article of claim 44 comprising at least about two layer pairs.

47. The reflecting article of claim 44 wherein the Group IB metal is Ag.

* * * * *